United States Patent [19]

Cooperman et al.

[11] Patent Number: 4,970,507
[45] Date of Patent: Nov. 13, 1990

[54] BROADBAND SWITCHING MATRIX FOR DELAY EQUALIZATION AND ELIMINATION OF INVERSION

[75] Inventors: Michael Cooperman, Framingham; Richard W. Sieber, Attleboro; Arnold Paige, Natick, all of Mass.

[73] Assignee: GTE Laboratories Incorporated, Waltham, Mass.

[21] Appl. No.: 324,848

[22] Filed: Mar. 17, 1989

[51] Int. Cl.⁵ .................... H04Q 1/00; H04N 7/10
[52] U.S. Cl. .................... 342/825.800; 340/825.020; 340/825.200; 340/825.890; 307/443; 307/480; 307/511
[58] Field of Search ............ 340/825.02, 825.2, 825.8, 340/825.87, 825.89, 825.85, 825.91, 825.93; 307/241, 443, 480, 571, 576, 594, 602, 511

[56] References Cited

U.S. PATENT DOCUMENTS

| | | | |
|---|---|---|---|
| 4,771,281 | 9/1988 | Fox et al. | 340/825.02 |
| 4,800,304 | 1/1989 | Takeuchi | 307/602 |
| 4,818,988 | 4/1989 | Cooperman et al. | 340/825.85 |
| 4,845,390 | 7/1989 | Chan | 307/602 |

Primary Examiner—Donald J. Yusko
Assistant Examiner—Dervis Magistre
Attorney, Agent, or Firm—James J. Cannon, Jr.

[57] ABSTRACT

A broadband switching array for equalizing the delay experienced by input signals as they propagate through their respective swtiching hpaths, and for providing output signals having uniform logical polarities. A cascaded set of delay means is connected to each of the input ports of the array in accordance with the amount of additional delay that is needed to accomplish equalization. Likewise, a cascaded set of inverter means is connected to each ouput port so that each switching path performs a common number of inversion operations, thereby allowing the output signals to have the same logical polarity.

7 Claims, 2 Drawing Sheets

BROADBAND SWITCHING MATRIX FOR DELAY EQUALIZATION AND ELIMINATION OF INVERSION

FIELD OF THE INVENTION

This invention relates to electrical switching systems and, more particularly, to broadband switching arrays having compensating circuits for propagation delay and polarity inversion.

BACKGROUND OF THE INVENTION

There is a major effort in the telecommunication industry to add broadband video services to the telephone network. For technical and economic reasons, the transmitted video will most likely be in digital form, requiring a rate of over 100 Mb/s. Since this high information rate is a thousand-fold greater than that of digitized voice, it will require techniques that emphasize high-speed performance.

Although optical switching has great switching speed potential, the technology has not matured enough to permit deployment. Consequently, electronic switching will be utilized in the first introduction of broadband video. Unfortunately, conventional electronic space switches experience diminished switching speed as the array size increases due to the proportional increase in capacitive loading. One matrix which addresses this problem of speed degradation is shown in FIG. 1, where a KxJ switching array is designed so that each crosspoint switch drives only one other crosspoint switch in the array.

Since the delay from input to output in FIG. 1 is a function of the path traversed by the signal, where the shortest path is from Row K to Output 1 and the longest path is from Row 1 to Output J. the array has the undesirable effect of having the inputs appear at the respective outputs with varying delays. Furthermore, the output logic polarity is non-uniform due to the even and odd numbers of stages present in the array. As a result, circuitry which receives and utilizes the output signals from the switching array of FIG. 1 requires additional control circuitry to compensate for the variable delays and non-uniform output polarities.

OBJECTS OF THE INVENTION

Accordingly, it is a primary object of this invention to obviate the above-noted and other disadvantages of the prior art.

It is a further object of this invention to provide a broadband switching matrix which equalizes the propagation delay present in each switching path of the array.

It is a further object of this invention to provide a broadband switching matrix where the input signals appear at their respective output ports with the same logical polarity.

SUMMARY OF THE INVENTION

In one aspect of this invention the above and other objects and advantages are achieved in a crosspoint switching array for connecting any one of a plurality of M input ports to any one of a plurality of N output ports. The array includes MxN crosspoint switching means arranged in M rows by N columns wherein each switching path has a known propagation delay and performs a series of inversion operations on an input signal propagating through the path. Delay equalization among all switching paths is accomplished by attaching a cascaded set of delay means to each of the M input ports via a first serial connecting means. The particular set of delay means for each input port is determined according to the propagation delay which already exists due to the array of MxN crosspoint switching means. The crosspoint switching array further includes inverter means. A second serial connecting means attaches a set of cascaded inverter means to each of the N output ports so that each switching path performs a common number of inversion operations on an input signal propagating through the respective path, thereby providing output signals with the same logical polarity.

In a preferred embodiment, the delay means includes dummy selector means having a first input a second input connected to a point of reference potential, and an output for selecting the digital signal present on the first input and inverting it before placing the inverted signal on said output.

DETAILED DESCRIPTION OF THE PREFERRED EMBODIMENT

Figure 1:
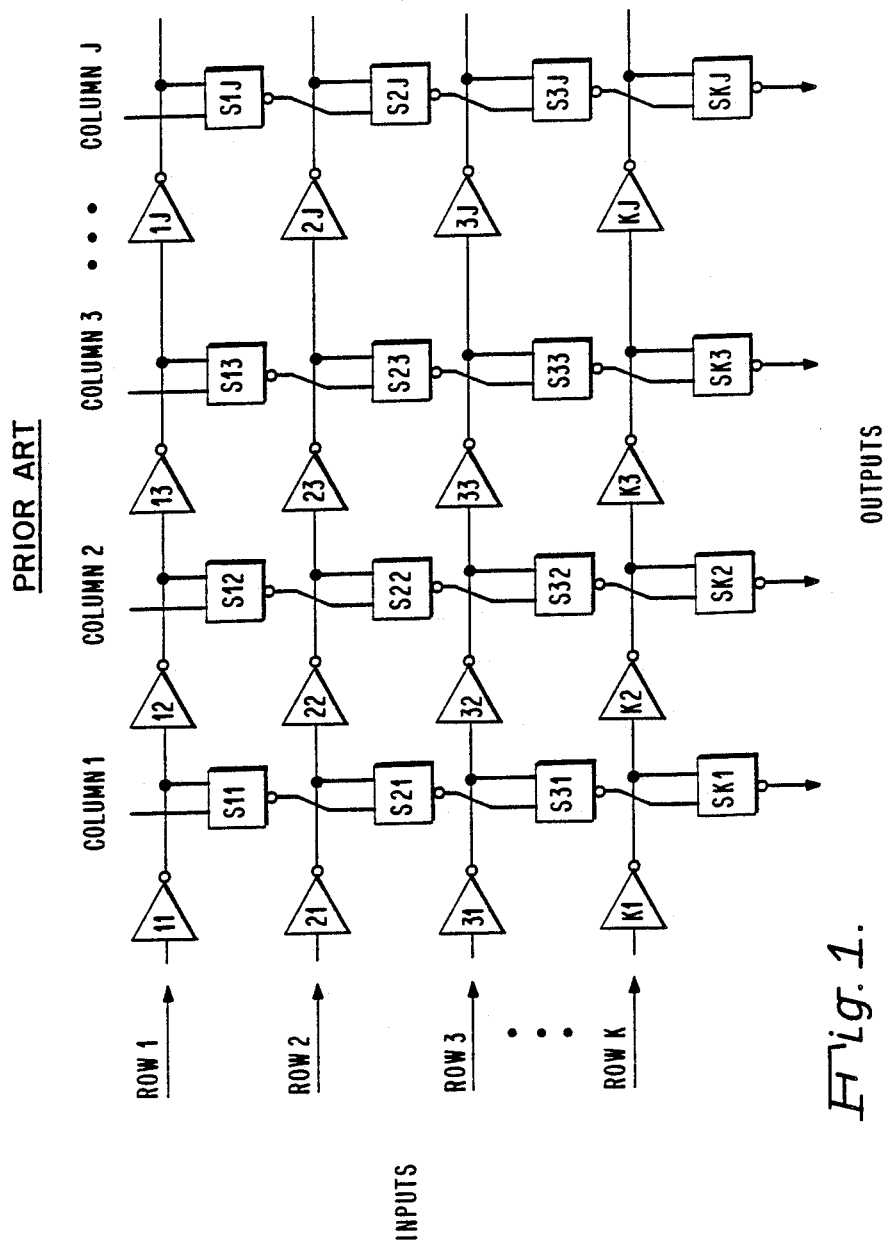
FIG. 1 is the schematic diagram of a broadband switching matrix disclosed in a copending application which is discussed hereinabove.

The switching matrix in FIG. 1. incorporated into the present invention has been disclosed in U.S. Pat. No. 4,818,988 entitled "Crosspoint Switching Array". issued Apr. 4, 1989 by the inventors of this application and assigned to the same assignee as this application, which is incorporated herein by reference, and specifically the drawings and descriptions of the preferred embodiments are incorporated herein by reference with respect to the structure and operation of the space switch matrix.

Figure 2:
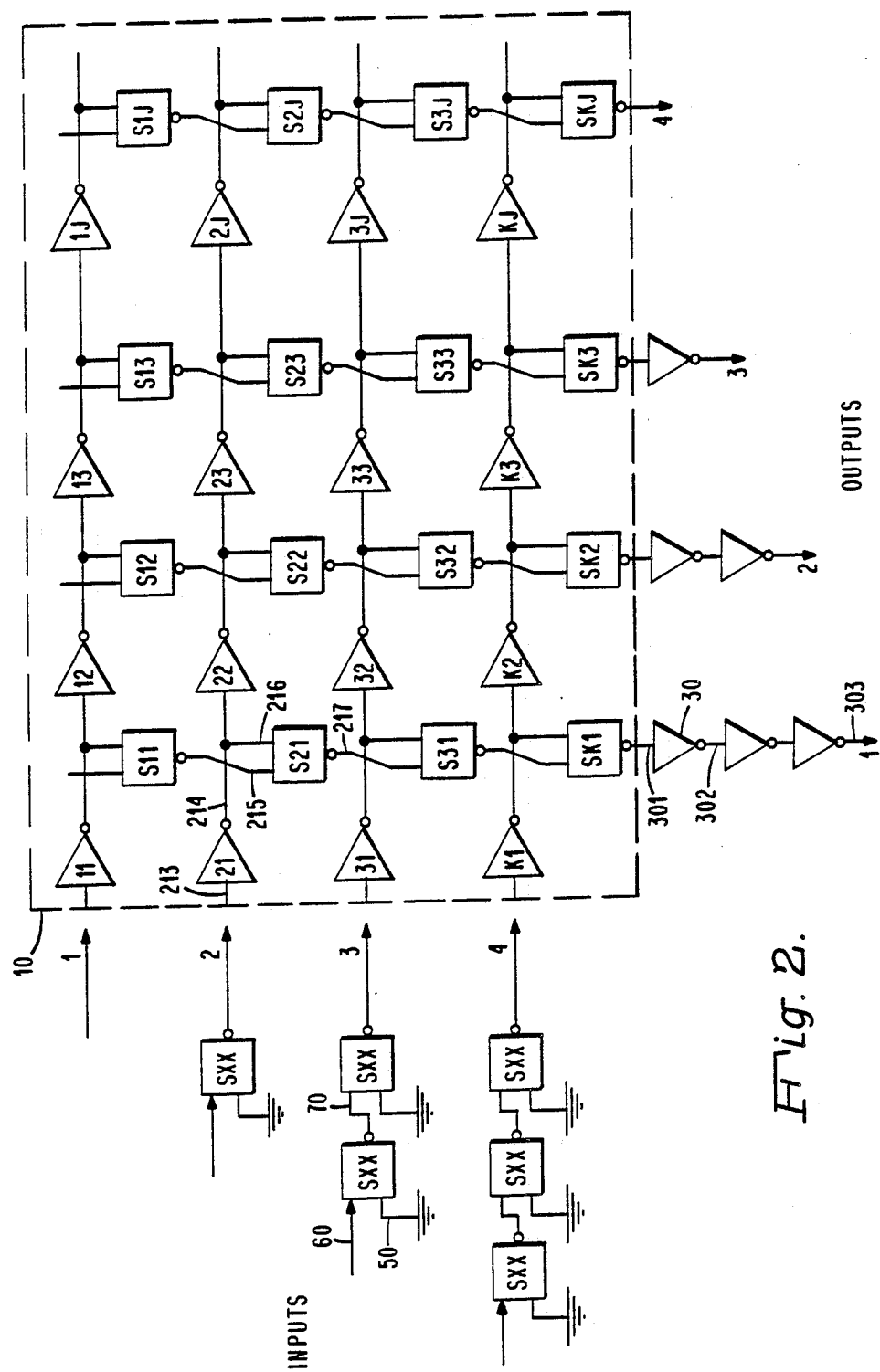
FIG. 2 is a schematic diagram of the improved switching array according to the present invention for equalizing propagation delay and providing outputs of the same logical polarity.

FIG. 2 shows a switching array according to the present invention having novel improvements to the above-mentioned matrix of FIG. 1. For the sake of clarity and simplicity, the operation of the present invention will be discussed in relation to a 4×4 switching array. As will be evident hereinafter, the array can be easily expanded to accommodate any matrix dimension.

The switching matrix shown in FIG. 1 is incorporated into the present invention as the array structure 10. Configuration 10 includes sixteen crosspoint switching means arranged in a 4×4 matrix wherein each crosspoint switching means includes an inverter element serving as a buffer and a 2:1 selector element for selecting one of the two input signals and placing the selected signal on an output line. For example, the crosspoint switch located at the intersection of Row 2 and Column 1 has an inverter 21 having an input 213 connected to the output of a preceding inverter in the row (or in this case to input port 2) and an output 214 connected to the input of a following inverter 22 in the row. The switch also has a selector S21 having a first input 215 connected to the output of a preceding selector S11 in the column, a second input 216 connected to the output of inverter 21, and an output 217 connected to the first input of the next selector element S31 in the column. for selecting the digital signal present on either input 215 or input 216 and placing it on output 217. Each other crosspoint switch in array 10 operates in the same manner.

Array 10 imposes variable delays on a propagating signal due to the different numbers of stages in each switching path, and also provides non-uniform output polarities resulting from the even and odd numbers of stages in the switching paths. As will be discussed next, delay equalization is accomplished by connecting dummy selectors SXX to the input ports, while uniform output polarities are achieved by connecting dummy inverters 30 to the output ports.

In order for each switching path in array 10 to provide the same delay to an input signal traversing the respective path, the array 10 is modified by introducing an additional delay at the input end of each switching path in the array. This is accomplished by connecting a particular set of cascaded 2:1 dummy selector elements SXX, each having a known time delay, to each of the input ports of array 10. Since each switching path in array 10 has a known propagation delay, the amount of delay which needs to be added and thus the number of dummy selector elements SXX. can easily be determined. Accordingly, an appropriate number of dummy selectors SXX are cascaded in series, if more than one is needed, and then connected to the input port.

The dummy selectors SXX are identical in structure and function to those in the crosspoint switches of array 10. The control on selector SXX always selects the upper input 60 and places the selected signal on output 70. The other input 50 is grounded to prevent floating inputs. Dummy selector SXX simply imposes a time delay on a digital signal as it propagates through the dummy selector SXX from input line 60 to output line 70. As with the selectors in array 10, the dummy selector SXX also performs an inversion operation on the selected signal.

When the selectors SXX are cascaded, the output of one dummy selector is connected to the input of a following dummy selector SXX in the series. At the input end of the matrix in FIG. 2, a digital signal applied to the ungrounded input line 60 of the first dummy selector in the series propagates through the remaining dummy selectors SXX in the respective series before appearing at the output of the last dummy selector in the series, whereupon the signal enters the input of buffer 31 in the first crosspoint switch in the row. Hereafter the signal proceeds through array 10 in accordance with the control signals applied to the 2:1 selector elements.

Referring specifically to the required numbers of additional selectors SXX in the 4×4 array of FIG. 2, a set of one, two and three cascaded dummy selectors SXX are connected to each of the input ports 2, 3, and 4, respectively, so that an input signal applied to each of these input ports will encounter a cumulative total of four selector elements, irrespective of the switching path, when the signal propagates through its designated path. The respective numbers of dummy selectors SXX and 2:1 crosspoint selector elements from array 10 in each switching path will obviously depend upon the particular path that is chosen.

In the embodiment of FIG. 2 according to the present invention, the output polarities are made non-inverting by connecting a cascaded set of dummy inverters 30 to each output port so that each switched signal experiences an even number of inversion operations while propagating through the signal's respective path of dummy selectors SXX, dummy inverters 30, and crosspoint selectors and inverters from the crosspoint switches of array 10.

Each inverter 30 has an input 301 and an output 302 for providing a signal of opposite polarity to that of the signal entering input 301. In a cascaded configuration, the output from one inverter serves as the input to the following inverter in the series. The signal appearing at an output port of array 10, such as output port 1, is applied to input 301 of the first dummy inverter 30 in the series, while the output 303 from the last inverter in the series serves as the input to external circuitry which may be coupled to the matrix outputs.

When deciding upon the proper number of dummy inverters 30 to use at an output port, the choice is led by the requirement that the series connection of dummy inverters must not only provide a non-inverted output signal at the output of the last inverter in the series, but also ensure that the cumulative delay from both the dummy inverters and the inverters from array 10 is the same for each switching path. For this reason, since each switching path in the 4×4 embodiment of FIG. 2 has four inverters, output port 1, for example, must include three dummy inverters even though only one inverter could have performed the same inversion. Similar determinations for the required number of inverters would be used for arrays of different dimensions.

What is claimed is:

1. A crosspoint switching array for connecting any one of a plurality of M input ports to any one of a plurality of N output ports, comprising;

MxN crosspoint switching means arranged in M rows by N columns wherein each of the crosspoint switching means introduces a polarity inversion when an input digital signal propagates through said switching means and proceeds to the next switching means in the row, and wherein each of the crosspoint switching means introduces a common propagation delay when the signal propagates through said switching means and is switched from row to column:

a delay means having an input end and an output end for imposing a time delay on a digital signal propagating through said delay means, said time delay being equal to the propagation delay of said crosspoint switching means:

first means for serially connecting a different set of cascaded delay means to each of the M input ports, the input end from one delay means being connected to the output end of a preceding delay means in the series and the output end from one delay means being connected to the input end of a following delay means in the series, so that each switching path in the array imposes the same cumulative delay on an input signal propagating through the respective path:

an inverter means having an input and an output for inverting the polarity of a digital signal entering the input of said inverter means and placing said inverted signal on said output; and second means for serially connecting a different set of cascaded inverter means to each of the N output ports, the input from one inverter means being connected to the output of a preceding inverter means in the series and the output from one inverter means being connected to the input of a following inverter means in the series, whereby each switching path in the array performs a common number of inversion operations on the input signal propagating through the respective switching path so that each output signal has the same logical polarity as said other output signals.

2. The array as recited in claim 1 wherein each of said MxN crosspoint switching means includes;
- a row input connection and a row output connection, the row input connection being connected to the row output connection of the preceding crosspoint switching means in the row, and the row output connection being connected to the row input connection of the following crosspoint switching means in the row:
- a column input connection and a column output connection, the column input connection being connected to the column output connection of the preceding crosspoint switching means in the column, and the column output connection being connected to the column input connection of the following crosspoint switching means in the column;
- row buffer means having an input connected to the row input connection and an output connected to the row output connection:
- crosspoint selector means having a first input connected to the column input connection, a second input connected to the row output connection, an output connected to the column output connection,
- said crosspoint selector means being operable in response to a first control condition at the control input means to provide a closed circuit condition between the first input and the output thereof and an open circuit condition between the second input and the output thereof;
- and said crosspoint selector means being operable in response to a second control condition at the control input means to provide an open circuit condition between the first input and the output thereof and a closed circuit condition between the second input and the output thereof.

3. A crosspoint switching array in accordance with claim 2 wherein said crosspoint selector means includes:
- first switching means having an input connected to the first input of the selector means and having an output:
- second switching means having an input connected to the second input of the selector means and having an output;
- column buffer means having an input connected to the outputs of the first and second switching means and having an output connected to the column output connection;
- said first switching means being coupled to said control input means: said first switching means being biased in a closed condition when the first control condition is present at said control input means, and being biased in an open condition when the second control condition is present at said control input means: and
- said second switching means being coupled to said control input means; said second switching means being biased in an open condition when the first control condition is present at said control input means, and being biased in a closed condition when the second control condition is present at said control input means.

4. A crosspoint switching array in accordance with claim 3 wherein:
- said row buffer means includes driver circuit means for producing a first predetermined voltage level at the output thereof in response to a digital signal of one binary value at the input thereto and for producing a second predetermined voltage level at the output thereof in response to a digital signal of the opposite binary value at the input thereto; and
- said column buffer means includes driver circuit means for producing said first predetermined voltage level at the output thereof in response to a digital signal of said one binary value at the input thereto and for producing said second predetermined voltage level at the output thereof in response to a digital signal of said opposite binary value at the input thereto.

5. A crosspoint switching array in accordance with claim 4 wherein:
- said driver circuit means of said row buffer means includes a row inverter circuit of a first row buffer transistor connected between a source of operating potential and said row output connection and a second row buffer transistor, complementary to said first row buffer transistor, connected between said row output connection and a point of reference potential said first and second row buffer transistors each having a control electrode connected to said row input connection: and
- said driver circuit means of said column buffer means 6. A crosspoint switching array in accordance with claim 5 wherein:
- said first switching means includes a first column switching transistor connected between said column input connection and the control electrodes of the first and second column buffer transistors and a second column switching transistor, complementary to said first column switching transistor, connected between said column input connection and the control electrodes of the first and second column transistors in parallel with said first column switching transistor;
- said second switching means includes a first row switching transistor connected between said row output connection and the control electrodes of the first and second column buffer transistors and a second row switching transistor, complementary to said first row switching transistor, connected between said row output connection and the control electrodes of the first and second column buffer transistors in parallel with said first row switching transistor;
- said first column switching transistor and said second row switching transistor being complementary transistors and each having a control electrode connected in common to a first control input connection;
- said second column switching transistor and said first row switching transistor being complementary transistors and each having a control electrode connected in common to a second control input connection:
- said first and second column switching transistors being biased for conduction therethrough and said first and second row switching transistors being biased to nonconduction when a first voltage level is present at said first control input connection and a second voltage level is present at said second control input connection: and said first and second row switching transistors being biased for conduction therethrough and said first and second column switching transistors being biased to nonconduction when said second voltage level is present at said first control input connection and said first voltage level is present at said second control input connection;

whereby when said first voltage level is present at said first control input connection and said second voltage level is present at said second control input connection, digital signals present at said column input connection are coupled to said column output connection; and whereby when said second voltage level is present at said first control input connection and said first voltage level is present at said second control input connection, digital signals present at said row input connection are coupled to said column output connection.

7. A crosspoint switching array as recited in claim 1 wherein:

each of said delay means includes a dummy selector means having a first input, a second input, and an output for accepting a digital signal from said first input and providing a signal of opposite polarity to that of said input signal at said output, said first input being connected to the output of a preceding dummy selector means in the series, said second input being connected to a point of reference potential, and said output being connected to the first input of a following dummy selector means in the series; and said first input of the first dummy selector means in said series being connected to the input port, and said output of the last dummy selector means in said series being connected to the input of the row buffer means of the first crosspoint switching means in the row;

whereby each switching path in the array imposes said common propagation delay on the input digital signal as said signal traverses the respective sequence of dummy selector means, crosspoint switching means, and inverter means in said path before appearing at said respective output port.

* * * * *